(12) United States Patent
Lovell

(10) Patent No.: US 10,057,646 B2
(45) Date of Patent: Aug. 21, 2018

(54) STORING SAME CHANNEL OVERLAPPING RECORDINGS

(71) Applicant: TiVo Solutions Inc., San Carlos, CA (US)

(72) Inventor: Nicholas Lovell, Mountain View, CA (US)

(73) Assignee: TiVo Solutions Inc., San Jose, CA (US)

( * ) Notice: Subject to any disclaimer, the term of this patent is extended or adjusted under 35 U.S.C. 154(b) by 129 days.

(21) Appl. No.: 14/965,766

(22) Filed: Dec. 10, 2015

(65) Prior Publication Data

US 2016/0100219 A1    Apr. 7, 2016

Related U.S. Application Data

(63) Continuation of application No. 13/931,071, filed on Jun. 28, 2013, now Pat. No. 9,240,217.

(Continued)

(51) Int. Cl.
*H04N 5/85* (2006.01)
*H04N 21/458* (2011.01)
(Continued)

(52) U.S. Cl.
CPC ....... *H04N 21/4583* (2013.01); *G11B 27/105* (2013.01); *H04N 5/76* (2013.01); *H04N 5/782* (2013.01); *H04N 21/4147* (2013.01); *H04N 21/435* (2013.01); *H04N 21/4325* (2013.01); *H04N 21/4334* (2013.01); *H04N 21/4345* (2013.01); *H04N 21/44008* (2013.01); *H04N 21/47214* (2013.01); *H04N 21/47217* (2013.01); *H04N 21/8456* (2013.01);
(Continued)

(58) Field of Classification Search
None
See application file for complete search history.

(56) References Cited

U.S. PATENT DOCUMENTS 9,240,217 B2    1/2016  Lovell
2011/0286719 A1*  11/2011  Woods ................ H04N 5/76
386/293

(Continued)

OTHER PUBLICATIONS

United States Patent and Trademark Office, U.S. Appl. No. 13/931,071, Non-Final Office Action dated Mar. 13, 2015.

(Continued)

*Primary Examiner* — Eileen M Adams
(74) *Attorney, Agent, or Firm* — Haley Guiliano LLP

(57) ABSTRACT

First media segments for a first media program are recorded. The first media program is scheduled to start at a first start time and end at a first end time, whereas a second media program is scheduled to start at a second start time and end at a second end time, the first end time being after the second start time. It is determined whether the first media program and the second media program are on a same channel. If so, one or more shared media segments, one of which is before all other shared media segments in the shared media segments and begins no later than the first time, are recorded. A first media program object is generated to represent a first recording of the first media program, and includes references to the first media segments and the shared media segments.

24 Claims, 9 Drawing Sheets

Related U.S. Application Data

(60) Provisional application No. 61/837,631, filed on Jun. 20, 2013.

(51) Int. Cl.

| | | |
|---|---|---|
| *G11B 27/10* | (2006.01) | |
| *H04N 5/76* | (2006.01) | |
| *H04N 5/782* | (2006.01) | |
| *H04N 21/432* | (2011.01) | |
| *H04N 21/433* | (2011.01) | |
| *H04N 21/434* | (2011.01) | |
| *H04N 21/435* | (2011.01) | |
| *H04N 21/472* | (2011.01) | |
| *H04N 21/845* | (2011.01) | |
| *H04N 21/4147* | (2011.01) | |
| *H04N 21/44* | (2011.01) | |
| *H04N 5/765* | (2006.01) | |
| *H04N 21/00* | (2011.01) | |
| *H04N 21/262* | (2011.01) | |
| *H04N 21/462* | (2011.01) | |

(52) U.S. Cl.
CPC ............. *H04N 5/765* (2013.01); *H04N 21/00* (2013.01); *H04N 21/26291* (2013.01); *H04N 21/4622* (2013.01)

(56) References Cited

U.S. PATENT DOCUMENTS

2012/0308200 A1\* 12/2012 DeLuca ................ H04N 5/76
　　　　　　　　　　　　　　　　　　386/241
2014/0376884 A1　12/2014 Lovell

OTHER PUBLICATIONS

United States Patent and Trademark Office, U.S. Appl. No. 13/931,071, Non-Final Office Action dated May 19, 2015.
United States Patent and Trademark Office, U.S. Appl. No. 13/931,071, Notice of Allowance dated Sep. 21, 2015.

\* cited by examiner

STORING SAME CHANNEL OVERLAPPING RECORDINGS

CROSS-REFERENCE TO RELATED APPLICATION; BENEFIT CLAIM

This application claims the benefit as a Continuation of U.S. patent application Ser. No. 13/931,071, filed Jun. 28, 2013, which claims priority to Provisional Patent Application No. 61/837,631 entitled Storing Same Channel Overlapping Recordings, filed on Jun. 20, 2013, by Nicholas Lovell, the entire contents of the preceding being hereby incorporated by reference as if fully set forth herein, under 35 U.S.C. § 120. The Applicant hereby rescinds any disclaimer of claim scope in the parent application or the prosecution history thereof and advises the USPTO that the claims in this application may be broader than any claim in the parent application.

FIELD OF THE INVENTION

The present invention relates to media recording. Specifically, the invention relates to using a single tuner for back-to-back overlapping recordings on the same channel.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In many areas of the world, programs often do not end on the half hour or hour. For example, a program could end at 7:10 pm instead of 7:00 pm as indicated in an electronic program guide. Paddings may be added around the actual showings of media programs by operators in their scheduling information. This can cause overlaps between previously scheduled adjacent media programs and fast depletion of tuners that can be used for recording the adjacent media programs.

In the U.S., similar problems exist with broadcast programs because the broadcast programs can run over their published end times and thus may cause overlaps with previously scheduled media programs. Tuner depletion as described above can also occur.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
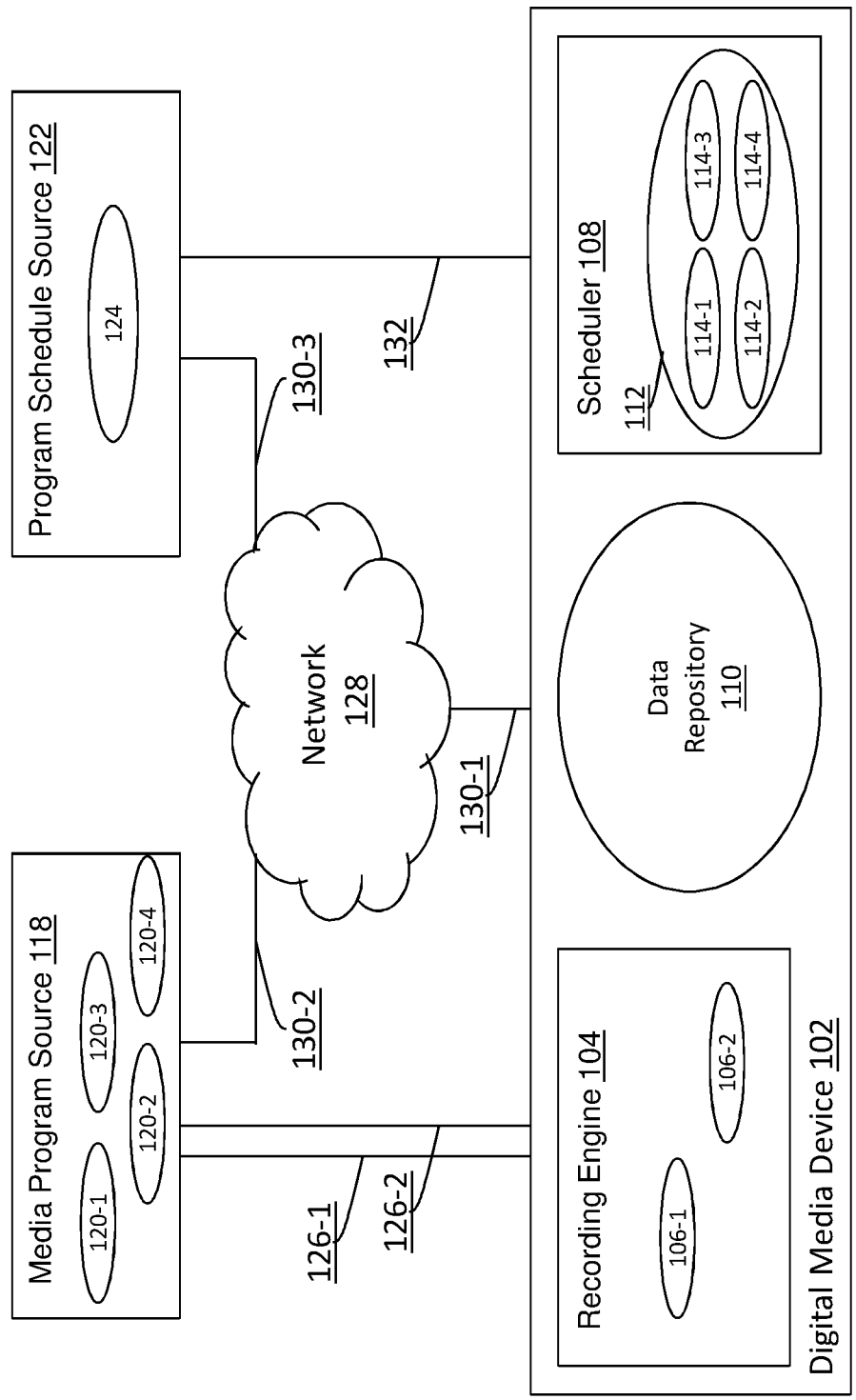
FIG. 1 illustrates an example configuration for recording back-to-back media programs in the same channel, in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 FUNCTIONAL OVERVIEW
2.0 SYSTEM ARCHITECTURE
3.0 OVERLAPPING MEDIA PROGRAMS
4.0 RECORDING SCHEDULE
5.0 MEDIA SEGMENTS
6.0 SHARED MEDIA SEGMENTS
7.0 CONSOLIDATED RECORDING
8.0 DUPLICATE RECORDINGS OF OVERLAPPED PORTION
9.0 EXAMPLE PROCESS FLOW
10.0 HARDWARE OVERVIEW
11.0 EXTENSIONS AND ALTERNATIVES

1.0 Functional Overview

Techniques for using a single tuner for back-to-back overlapping recordings on the same channel as described herein may be implemented in software components, hardware components, or a combination of software and hardware components.

In some embodiments, a multimedia device sets up a recording schedule for selected media programs based on scheduling information (e.g., via a local electronic program guide, a network electronic program guide, web-based published guide information, etc.) accessible by the multimedia device. Tuners and other recording resources may be allocated in the recording schedules for recording the selected media programs based on start times and end times of the selected media programs as described in the scheduling information. Padding or extra recording times may be made by network operators (e.g., using notifications inserted into the broadcast signal by the network operator, etc.) and/or by a user as parts of media programs to be recorded by the multimedia device.

Conventional recording systems create a video file for each recorded program. For example, when a broadcast network indicates to the recording system that a first program is anticipated to overrun by 30 minutes, a recording is scheduled for the first program by the recording system to continue recording 30 minutes after the scheduled end time of the first program. When the 30 minutes have passed, the recording system ends the recording and stores the recording as a single file. If the recording system has not canceled a scheduled recording of a second subsequent program on the same channel because of the recording overlap conflict, it will begin the recording of the second subsequent program after the recording of the first program ends. The recording of the second subsequent program is stored as a file.

A problem arises when the first program does not run over by the 30 minutes as anticipated by the broadcast network and the second subsequent program starts during the 30 minute time frame. In this example, the portion of the second subsequent program that started within the 30 minute time frame resides in the recording of the first program. The user is forced to watch the end of the recording of the first program in order to view the beginning of the second subsequent program. If the recording of the first program is deleted, then the portion of the second subsequent program in the recording of the first program is lost.

Techniques as described herein can be used to enable a multimedia device to record back-to-back media programs (e.g., broadcasted, presented, received, provided, etc.) on the same channel, using the same tuner, so that entire showings of these back-to-back media programs can be recorded and played back to a user of the multimedia device, even if those back-to-back media program recordings overlap with one another.

In some embodiments, a scheduler in a multimedia device may be used to schedule recordings by the multimedia device. For example, the scheduler may initially set up a first scheduled recording of a first media program (e.g., an original media program, etc.), which is overlapped by a second scheduled recording of a second media program (e.g., an overlapping media program, etc.) based on at least a portion of scheduling information. In some embodiments, a recording engine in the multimedia device is configured to record media segments (e.g., audio chunks/clips, video chunks/clips, audiovisual chunk/clips, etc.) for a scheduled recording of a media program.

In a first example implementation, the recording engine is configured to record zero, one or more first media segments before the start time of the second scheduled recording of the second media program. The first media segments are included in the first scheduled recording of the first media program, but not by the second scheduled recording of the second media program.

The recording engine is also configured to record one or more shared media segments after the first media segments. The shared media segments are to be shared by the first scheduled recording of the first media program and the second scheduled recording of the second media program.

In some embodiments, the recording engine is further configured to record zero, one, or more second media segments after the shared media segments. The second media segments are included in the second scheduled recording of the second media program, but not by the first scheduled recording of the first media program.

In a second example implementation, a recording engine in a multimedia device is configured to first make a consolidated recording of two or more overlapping scheduled recordings of two or more media programs. The consolidated recording starts recording at the earliest start time of the two or more media programs and ends recording at the last end time of the two or more media programs. The multimedia device determines, for each media segment in the consolidated recording, which scheduled recordings of the two or more media programs should reference/include that media segment. The multimedia device updates each media program object representing a corresponding media program of the two or more media programs to include references to media segments that should be referenced and/or included in that media program object.

In some embodiments, a media segment that includes a beginning portion of an overlapping media program (e.g., the second media program in the previous example, etc.) may be split into two media segments at the start time of the overlapping media program. A first media segment, which is recorded before the start time of the overlapping media program, of the two media segments is to be referenced by the original media program but not by the overlapping media program. A second media segment, which is recorded after the start time of the overlapping media program, of the two media segments is to be a shared media segment between the original and overlapping media programs.

In some embodiments, a media segment that includes an end portion of an original media program (e.g., the first media program in the previous example, etc.) may be split into two media segments at the end time of the original media program. Of the two media segments, the media segment that precedes and is up to the end time of the original media program is to be a shared media segment referenced by both the original media program and the overlapping media program. Of the two media segments, the media segment that starts from the end time of the original media program is to be referenced by the overlapping media program but not by the original media program.

Accordingly, as in the first example implementation, each of the media programs for which the consolidated recording includes can be represented by a corresponding media program object that maintains references to media segments in the consolidated recording and that can be used for playback and trick play purposes.

In a third example implementation, a recording engine in a multimedia device is configured to spawn off different writing operations/threads for different overlapping media programs. For example, each writing thread for a respective overlapping media program receives media data from the same channel and records its own media segments based on the received media data from the same channel. In some embodiments, the recording engine is configured to end such a writing thread when the respective overlapping media program ends.

A multimedia device as described herein may be one or more of tablet computers, digital video recorders, set-top boxes, handheld devices, laptops, e-readers, personal computing devices, game devices, or display systems, whereas the second device is a different one of tablet computers, digital video recorders, set-top boxes, handheld devices, laptops, e-readers, personal computing devices, game devices, or display systems.

Some examples of multimedia device such as a digital video recorder (DVR) and of media segments are described in U.S. Pat. No. 6,233,389, which is incorporated by reference as though originally disclosed herein. In some embodiments, the multimedia device may further comprise some or all of the software and/or components as illustrated in FIG. 1 through FIG. 5.

2.0 System Architecture

Although a specific computer architecture is described herein, other embodiments of the invention are applicable to any architecture that can be used to perform the functions described herein.

FIG. 1 illustrates an example system configuration for using a single tuner for back-to-back overlapping recordings on the same channel, in accordance with an embodiment.

In some embodiments, a multimedia device (102) may comprise a recording engine (104) configured to generate scheduled recordings of one or more media programs (e.g., 120-1, 120-2, 120-3, 120-4, etc.) received via one or more channels (e.g., 126-1, 126-2, etc.) from one or more media program sources (e.g., 118, etc.). In some embodiments, scheduled recordings of media programs and/or other data and configuration information needed by the multimedia device (102) in operations may be stored in a data repository (110) (e.g., network accessed storage, cloud storage, shared storage, etc.). Media program objects that represent scheduled recordings of media programs, media segments (e.g., streamed media files, etc.) that are included/referenced by respective media program objects or scheduled recordings, media segment objects that point to media segments, reference counts of various objects, etc., may be stored in and accessed through the data repository (110).

A media program source may be a media program server system implemented by one or more computing devices to deliver media programs to one or more multimedia devices (e.g., 102, etc.) concurrently, sequentially, or in part concurrently in part sequentially. Examples of media program sources include but are not limited to any of: cable distribution systems, satellite broadcast systems, over-the-air broadcast stations, network-based content servers, etc.

A channel as described herein refers to a media data pipeline (e.g., between a media program source and the multimedia device (102), etc.) that carries audio and/or video signals, streams of media programs, in-band control and data information (e.g., along with a stream of a media program, etc.), out-of-band control and data information (e.g., separate from any stream of media program, etc.), etc. A channel may be a unidirectional or bidirectional channel for which a tuner can be provisioned/tuned to receive media programs from a media program source. Examples of channels include but are not limited to any of: cable channels, broadcast channels, broadband channels, media data streams, media data download, media data deliveries, etc. A channel can be provided to the multimedia device (102) through one or more of over-the-air broadcasts, cable networks, satellite broadcasts, mobile data networks, networks comprising any of the internet, local area networks (LANs), wide area networks (WANs), dedicated links, private computer networks, public computer networks, enterprise computer networks, etc. Some examples of channel, tuner and multimedia devices are described in U.S. patent application Ser. No. 13/651,248, which is incorporated by reference as though originally disclosed herein.

The recording engine may be configured with one or more tuners (e.g., 106-1, 106-2, etc.). A tuner may refer to an audio tuner, a video tuner, an audiovisual tuner, a system resource unit, a system component, a signal processing unit, etc., which can be provisioned, tuned, allocated, assigned, used, etc., (e.g., on demand, in advance, etc.) by the multimedia device (102) to receive one or more media programs (e.g., 120-1, 120-2, 120-3, 120-4, etc.) from one or more media program sources (e.g., 118, etc.). A tuner can be configured at any given time by the multimedia device (102) to start receiving media data from a specific channel in one or more channels from a media program source (e.g., 118, etc.) and/or to stop receiving media data from any other channel in the channels.

In some embodiments, the multimedia device (102) may comprise a scheduler (108) configured to receive advance and/or real time scheduling information (124) relating to individual media programs (e.g., 120-1, 120-2, 120-3, 120-4, etc.) from one or more program schedule sources (e.g., 122, etc.). A program schedule source may be a program schedule server system implemented by one or more computing devices to provide advance and/or real time scheduling information to one or more multimedia devices (e.g., 102, etc.) concurrently, sequentially, or in part concurrently in part sequentially. Examples of program schedule sources include but are not limited to any of: cable distribution systems, satellite broadcast systems, over-the-air broadcast stations, network-based content servers, internet sources, etc. A program schedule source may, but is not required to, be a part of a media program source (e.g., 118, etc.).

The multimedia device (102) can be configured to receive the scheduling information (124) in one or more of a variety of ways. In an embodiment, the multimedia device (102) can receive at least a part of the (e.g., in band, etc.) scheduling information (124) in a channel that is delivering or will deliver a media program described in the received scheduling information. In an embodiment, the multimedia device (102) can receive at least a part of the scheduling information (124) in a separate (e.g., data, auxiliary, etc.) channel which does not deliver a media program described in the scheduling information (124); the separate channel may, but is not required to, be a part of an overall input signal that includes the channel that is delivering or will deliver the media program to the multimedia device (102).

As illustrated in FIG. 1, the multimedia device (102) can receive, from one or more program schedule sources (e.g., 122, etc.), at least a part of the scheduling information (124) over one or more network connections (e.g., 132, etc.). At least one of these network connections can comprise a wireless link, a wire-based link, a telephony-based link, an in-band communication link implemented in a channel receivable by the multimedia device (102), an out-of-band communication link, a communication path through the internet, etc.

Based at least in part on the scheduling information (124) and the availability of tuners (e.g., 106-1, 106-2, etc.), recording resources, etc., the multimedia device (102) can create, update, or maintain a recording schedule (112). The recording schedule (112) comprises a set of scheduling records (e.g., 114-1, 114-2, 114-3, 114-4, etc.) for scheduled recordings of selected media programs. A scheduling record (e.g., 114-1, etc.) for a scheduled recording of a (corresponding) media program may comprise one or more of data fields identifying a specific media program source providing the selected media program, specific start and end times of the selected media program, a (e.g., real-time, etc.) recording status for the selected media program, a specific channel at which the selected media program can be received by the multimedia device (102), a specific tuner (e.g., 106-1, etc.) which has been assigned by the multimedia device (102) to receive the selected media program. The recording schedule (112) may be persistently or temporarily stored in one or more data structures accessible by the multimedia device (102). Scheduling records in the recording schedule (112) may, but are not required to, be organized into one or more recording sub-schedules each of which corresponds to a respective tuner (e.g., 106-1) in the one or more tuners (e.g., 106-1, 106-2, etc.). A recording sub-schedule that corresponds to a tuner (e.g., 106-1) can comprise a subset of scheduling records for scheduled recordings of a subset of selected media programs (e.g., 120-1, 120-2, 120-3, 120-4, etc.) to be received by the corresponding tuner (106-1 in the present example).

In some embodiments, the recording schedule (112) can comprise scheduling records for (selected) media programs requested by a user for inclusion in the recording schedule (112). For example, the multimedia device (102) or a device/system (e.g., the media program source 118, the program schedule source 122, a computing system locally or remotely connected with the multimedia device (102), etc.) working in conjunction with the multimedia device (102), can be configured to receive user input (e.g., via a remote control device, a pointer device for a graphic user interface, a menu, an explicit textual input, a short message generated by the user, etc.) from a user. The user input identifies one or more (selected) media programs to be included in the recording schedule (112). The user input can, but is not required to, have an explicit identifier for a selected media program to be included in the recording schedule (112), so long as the user input contains sufficient information that leads to an explicit identification of the selected media program. For example, the user input can, but is not required to, have keywords, actors or personalities who appear in the media programs, identifying information for related program series or regular programming, etc., that lead to an explicit identification of a selected media program.

Time paddings, etc., may be specified for any selected media program in a recording schedule (112). Some examples related to time paddings, etc., are described in U.S. Pat. Nos. 7,882,520 and 7,877,768, the entire content of which are incorporated by reference herein.

In some embodiments, the recording schedule (112) can comprise scheduling records for one or more scheduled recordings of one or more (selected) media programs automatically selected without a user's specific request identifying the media programs for inclusion in the recording schedule (112). For example, the multimedia device (102) or a device/system (e.g., the media program source 118, the program schedule source 122, a computing system locally or remotely connected with the multimedia device (102), etc.) working in conjunction with the multimedia device (102), can be configured to automatically identify and include (selected) media programs in the recording schedule (112) based on a user's viewing preferences, a user's viewing history, a user's identifying characteristics, etc., that do not contain identifying information of the selected media programs.

In some embodiments, the recording schedule (112) can comprise scheduling records for one or more scheduled recordings of one or more (selected) media programs first automatically selected without a user's specific request identifying the media programs as one or more of candidates for inclusion in the recording schedule (112). Subsequently, the user may be notified of the candidates for inclusion in the recording schedule (112). Upon further selection and/or identification by the user, zero, some or all of the candidates may be included in the recording schedule (112).

Scheduling information may refer to, without limitation, information such as electronic program guides, program lists on various content servers, program lists on various multimedia devices, etc., that describes what media programs may be available from media program sources such as content providers, network operators, cable networks, broadcast stations, broadcast sources, broadband sources, media data stores from remote and local multimedia devices, etc. Examples of scheduling information (e.g., 124, etc.) include but are not limited to any of: start time of individual media programs, end time of individual media programs, program attributes (e.g., channel, resolution, title, rating, etc.), etc.

In some embodiments, scheduling information (e.g., 124, etc.) as received by the multimedia device (102) can be repeated (e.g., daily, twice daily, four times daily, etc.), canceled, altered, updated, dynamic and changing. Different program schedule sources may dispense scheduling information in different frequencies, in different degrees of accuracy, in different degrees of timeliness, etc.

In an example, a program schedule source may send schedule updates or alerts as soon as changes of scheduling information with respect to any particular media programs are known and confirmed by the program schedule source. In another example, a program schedule source may send scheduling information with respect to any particular media programs once and then send changes of scheduling information with respect to these media programs shortly before or even during the broadcast/sending of the media programs to multimedia devices.

Thus, some (e.g., scheduling updates, scheduling alerts, etc.) of scheduling information (e.g., 124, etc.) may represent additions, deletions, changes, etc., of previously sent scheduling information (e.g., 124, etc.). In some embodiments, the multimedia device (102) can be configured to alert a user of scheduling updates, solicit user input from a user to resolve any scheduling conflicts in the recording schedule (112) or to schedule media programs with overlaps specified in the scheduling information and/or specified by the user. In some embodiments, the multimedia device (102) can be configured to ignore at least some of the scheduling updates and alerts in the received scheduling information (124) for at least some of the selected media programs already scheduled for recording in the recording schedule (112). The ignored scheduling updates and alerts may, for example, indicate a selected media program with new start and end times overlapping with another selected media program using the same tuner.

One, some or all of the multimedia device (102), the program schedule source (122), the media program source (118) as illustrated in FIG. 1 can have one or more network connections (e.g., 130-1, 130-2, 130-3, etc.) to one or more networks (e.g., 128). These network connections (130-1, 130-2, 130-3, etc.) may enable a device/system/server to communicate with a variety of other devices/systems/servers (e.g., 102, 118, 122, etc.) not necessarily all depicted in FIG. 1. A multimedia device (e.g., 102, etc.) as described herein can, but is not limited to be any of: digital video recorders, set-top boxes, tablet computers, handheld devices, laptops, e-readers, personal computing devices, game devices, display systems, etc. It should be noted that any, some or all of the illustrated channels (e.g., 126-1, 126-2, etc.) and the network connections (e.g., 132, etc.) can be implemented through the network connections (e.g., 130-1, 130-2, 130-3, etc.). A network (e.g., 128, etc.) as described herein can, but is not limited to be any of: local area networks, wired or wireless networks, blue tooth networks, wide area networks, the internet, intranets, extranets, dedicated links such as serial links, HDMI connections and USB connections, combinations of these and other networks and links, etc.

A multimedia device (e.g., 102, etc.) as described herein may accumulate and buffer a (e.g., thirty minute, etc.) portion of a media program. The buffered portion of the media program may be used to support any of a normal playing mode at the current wall clock time, a normal playing mode at a time preceding the current wall clock time, one or more fast forward (1.2×, 1.5×, 1.8×, etc. of the normal playing speed) playing modes at a time preceding the current wall clock time, one or more rewind playing modes from the current wall clock time, etc.

A multimedia device (e.g., 102, etc.) as described herein may be configured to present screen displays to, and to receive user commands from, a user. The user may navigate interactively among the screen displays to specific media programs in which the user is interested, and to direct the multimedia device (102) to obtain information about media programs, to play selected media programs, to receive, download, side-load, etc., media programs. In some embodiments, side-loading refers to a loading of a media program performed in parallel with a playing of another media program.

As used herein, a media program may comprise audio and/or video content including but not limited to any of: audio and/or video data, audio and/or video transcription data, multimedia data, internet downloaded content data, multimedia data with markup language pages, videos, movies, multimedia presentations, audio books, electronic books, podcasts, etc. A media program may be received with any of a wide variety of formats defined by standard or proprietary specifications including but not limited to any related to: analog TV channel, digital TV channel, CD, MPEG-1, MPEG-2, and MPEG-2.5 Audio Layer III (MP3), Advanced Audio Coding (AAC), DVD, HD DVD, Blu-ray Disc, H.261, H.263, H.264/MPEG-4, HDMI, etc.

Media programs (e.g., TV shows, movies, live broadcasts, etc.) may run/last for varying time durations. In an example, a TV show may last 30 minutes. In another example, a movie may last 2 hours. In yet another example, a live broadcast may have indeterminate time duration until the broadcast is over. A media program as described herein may be copyright free and thus content of the media program may be copied without legal limitation. Alternatively, a media program may be copyright protected and thus the content of the media program may only be copied, recorded or distributed if digital rights to the media program for performing these operations are secured and verified. In some embodiments, a multimedia device (102) as described herein may be configured to work with other systems if necessary and verify whether a user of the multimedia device possesses sufficient digital rights to a media program. The recording of the media program may be performed in compliance with the user's verified digital rights to the media program.

Digital rights as described herein include but are not limited to any of: playing rights, copying rights, distribution rights, etc. In response to a successful interrogation/validation of the user's digital rights to the media program, the multimedia device (102) may be configured to record the media program in compliance with the digital rights that have been verified.

A scheduled recording of a media program may be specified with a start time and an end time, and refers to a recording between the start time and the end time. The scheduled recording of the media program may comprise the actual showing of the media program and zero, one or more paddings (e.g., immediately, indirectly, etc.) before or after the media program. A padding in the scheduled recording may be specified in either or both of scheduling information and user input received by a multimedia device.

In some embodiments, one or more tags may be embedded in a media program recorded by a multimedia device (e.g., 102, etc.). Techniques related to tags are described in U.S. Pat. No. 7,889,964, the entire contents of which are incorporated by reference herein. A media program source (e.g., 118, etc.) as described herein may be configured with a mechanism for inserting tags into a media program. Tags may be inserted into a media stream prior to or at the time of transmission. The tags contain command and control information that a recipient device translates and acts upon. During the tag processing stage, the recipient device may be configured to perform operations as described herein in response to the tags. Tags can be used to indicate the start and end points of a program segment, a subset of media data units, etc. Tags can be used to indicate a presence of a media feature, an absence of a media feature, etc. The recipient device may be configured to fast forward, slow forward, skip over a program segment, replace a program segment, etc., during playback in response to the tags or user input related to the tags.

Menus, icons, and Web pages may be displayed a multimedia device (e.g., 102, etc.) as described herein to the user based on information included in a tag. The user may interact with the menu, icon, or Web page through an input device. The multimedia device (102) performs the actions associated with the menu, icon, or Web page and the user's input. Tags may be used to create indexes in media data, media streams, media files, etc. This allows the user to jump to particular indexes in the media program, a different media program, a different display, etc.

3.0 Overlapping Media Programs

Massive amounts of padding or extra recording times may be made as parts of media programs (e.g., a season pass that records a block or a series of shows like Law and Order, NCIS, the Super Bowl, NBA playoffs, the Final Four games, etc.) to be recorded by a multimedia device. A media program source or provider may not hold actual showings of media programs to what has been published for the media programs in schedule information. An EPG or in-band signal may automatically include time extension padding values (e.g., 20 minutes, 30 minutes, 1 hour, default, etc.) for each of a plurality of actual showings of some media programs. These paddings may or may not be overridable by users. A media program source or provider may reschedule media programs from time to time. Live programs such as soccer matches, etc., may run into overtime possibly for hours. A tuner that is still recording paddings of some media programs cannot be used to record other media programs. A multimedia device that has been scheduled with many back-to-back and/or overlapping media effectively has far fewer tuners available for recording than otherwise.

As used herein, paddings refer to portions of media data portion added before or after the actual showings of media programs. In a scheduled recording of the media program, one or more paddings that precede or succeed the actual showing of a media program may be deemed to be a part of the media program for playback and trick play purposes. When a user selects the media program from one or more recorded media programs for playback or any trick play action, the paddings are retrieved as a part of the media program. Paddings to media programs can be added by content providers or network operators on purpose, for example, in order to prevent users from skipping commercial messages before or after an actual showing of a media program. Paddings can also be added by users. For example, a user may be notified that a particular media program is a live broadcast, or otherwise a show which the users do not wish to miss. The user accordingly may explicitly or implicitly instruct a multimedia device to record the particular media program with paddings.

Under other approaches that do not implement the techniques as described herein, relatively numerous tuners would have to be used to record back-to-back media programs scheduled for recording. However, a multimedia device may not have more than one tuner. Any additional tuners may be quickly depleted for recording back-to-back media programs in these other approaches. Consequently, a user may have to cancel or reject some of the media programs that overlap. Alternatively, partial recordings may have to be made for some of the media programs that overlap. This problem becomes worse when scheduling information does not contain the precise start times and end times of actual showings of media programs. A user may have to guess what actual start and end times might be for the selected media programs. A user may have to prioritize overlapping media programs based on inaccurate scheduling information. A user may have to over-specify amounts of paddings. A user's guessed start and end times of the selected media programs may turn out to be incorrect, wasteful, or insufficient to avoid over or under recording of selected media programs. This can be especially problematic if media programs to be recorded are back-to-back with one another, if a content provider frequently or routinely shifts actual start and end times of (e.g., most if not all, etc.) media programs the content provider transmits, if some of the selected media programs are (e.g., indicated with scheduling information as, etc.) live broadcasts, etc.

In contrast, techniques as described herein can be used to prevent, alleviate, or solve the above-mentioned problems afflicting the other approaches. Under these techniques, overlaps between multiple back-to-back media programs in the same channel do not cause the dropping of scheduled recordings of media programs for reasons of not having enough tuners, so long as there is one tuner available for the channel to use.

4.0 Recording Schedule

In some embodiments, a scheduler (e.g., 108, etc.) in a multimedia device (e.g., 102, etc.) may initially set up a first scheduled recording of a first media program (e.g., an original media program, etc.), which is overlapped by a second scheduled recording of a second media program (e.g., an overlapping media program, etc.) based on at least a portion of scheduling information. The second media program overlaps the first media program because one or more paddings are added to one or both of the first media program and the second media program.

In some embodiments, the scheduler (108) may ignore a scheduling conflict (e.g., overlaps between media programs, etc.) caused by additions of paddings to back-to-back media programs in the same channel and add these back-to-back media programs with their overlapping start times and end times in the scheduler's recording schedule (112), even if the multimedia device (102) has only one tuner. In some embodiments, the multimedia device (102) may have more than one tuner, the scheduler (108) may free up more tuners for recording in various channels by assigning the same tuner (e.g., 106-1, etc.) to a channel which multiple back-to-back media programs have been scheduled for recording.

For the purpose of illustration, media programs 120-1, 120-2, 120-3, 120-4, etc., to be delivered by the media program source (118) have been scheduled into the recording schedule (112) of the multimedia device (102) for the tuner (106-1). The recording schedule (112) comprises scheduling records 114-1, 114-2, 114-3, 114-4, etc., for scheduled recordings of media programs 120-1, 120-2, 120-3, 120-4, etc., respectively. The recording schedule (112) may comprise additional scheduling records for scheduled recordings of media programs (not shown) to be recorded with any of one or more tuners (e.g., 106-1, 106-2, etc.).

Figure 2:
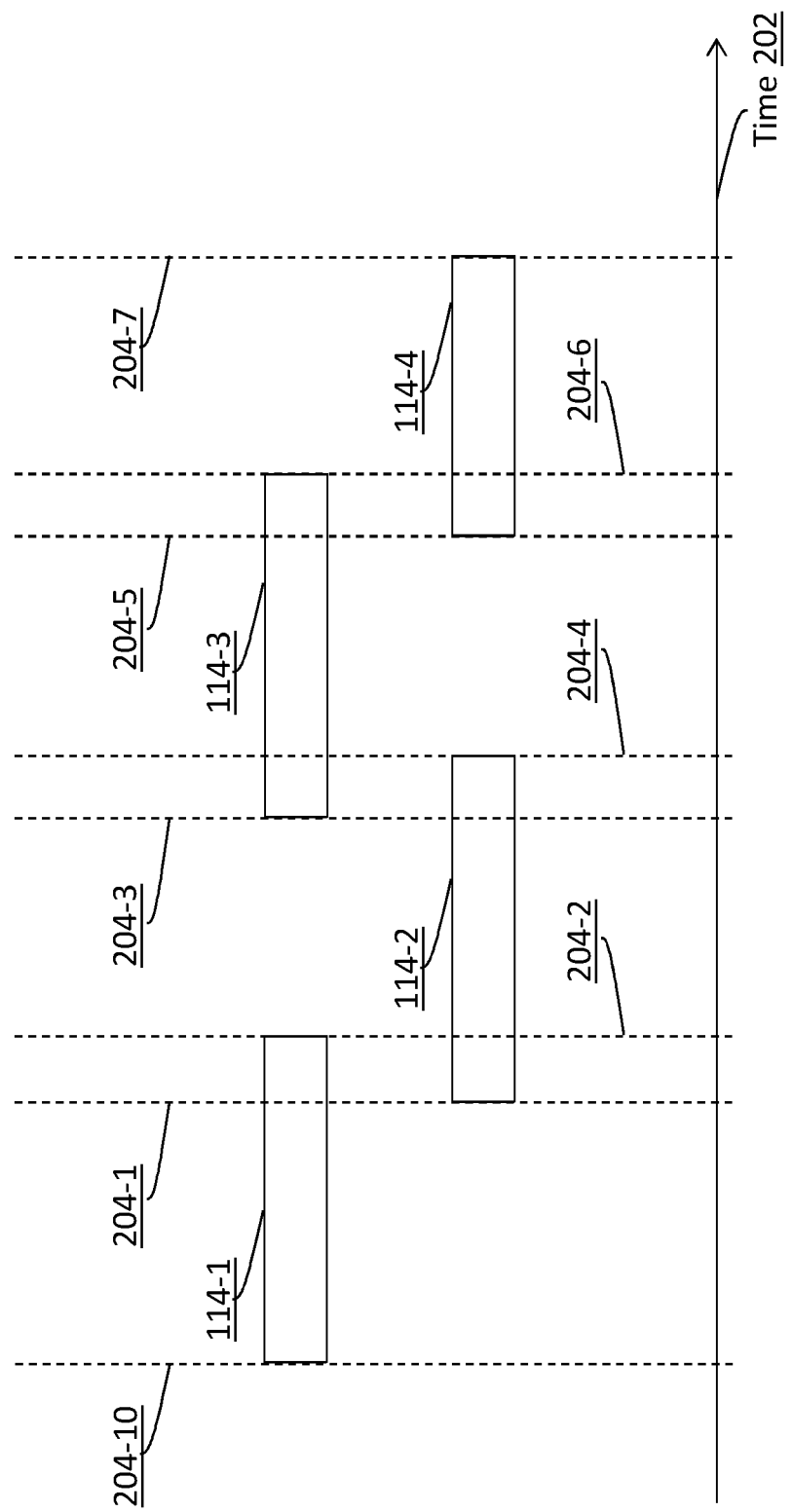
FIG. 2 illustrates example scheduling records, in accordance with an embodiment.

As illustrated in FIG. 2, the scheduling records (114-1, 114-2, 114-3 and 114-4) in the recording schedule (112) identify the end time of a scheduled recording of media program 120-1 as a time point 204-2; the start time and end time of a scheduled recording of media program 120-2 as time points 204-1 and 204-4 respectively; the start time and end time of a scheduled recording of media program 120-3 as time points 204-3 and 204-6 respectively; and the start time and end time of a scheduled recording of media program 120-4 as time points 204-5 and 204-7, respectively. These time points may refer to different time points along a time axis 202 (e.g., representing real time, time from a certain epoch time, clock time, a local time at a specific locale, a global standard time, etc.). As illustrated in FIG. 2, a scheduled recording of the media programs 120-1 through 120-4, as represented by their start times and end times in each of the scheduling records (114-1, 114-2, 114-3 and 114-4) of the recording schedule (112) for recording with the tuner (106-1), may overlap with zero, one or more scheduled recordings of the others of the media programs 120-1 through 120-4.

5.0 Media Segments

Figure 3A:
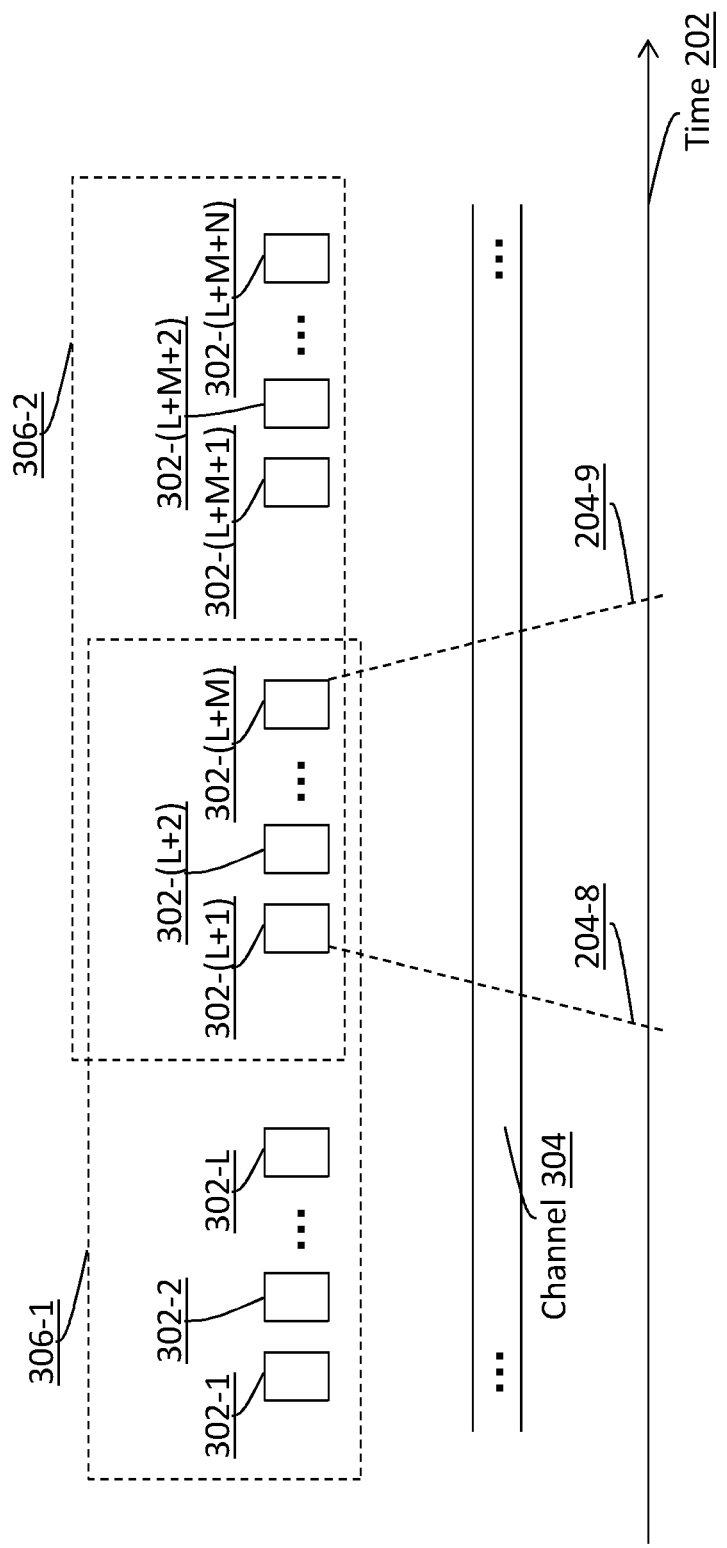
FIG. 3A, FIG. 3B and FIG. 3C illustrate example media program objects, in accordance with one or more embodiments.
Figure 3B:
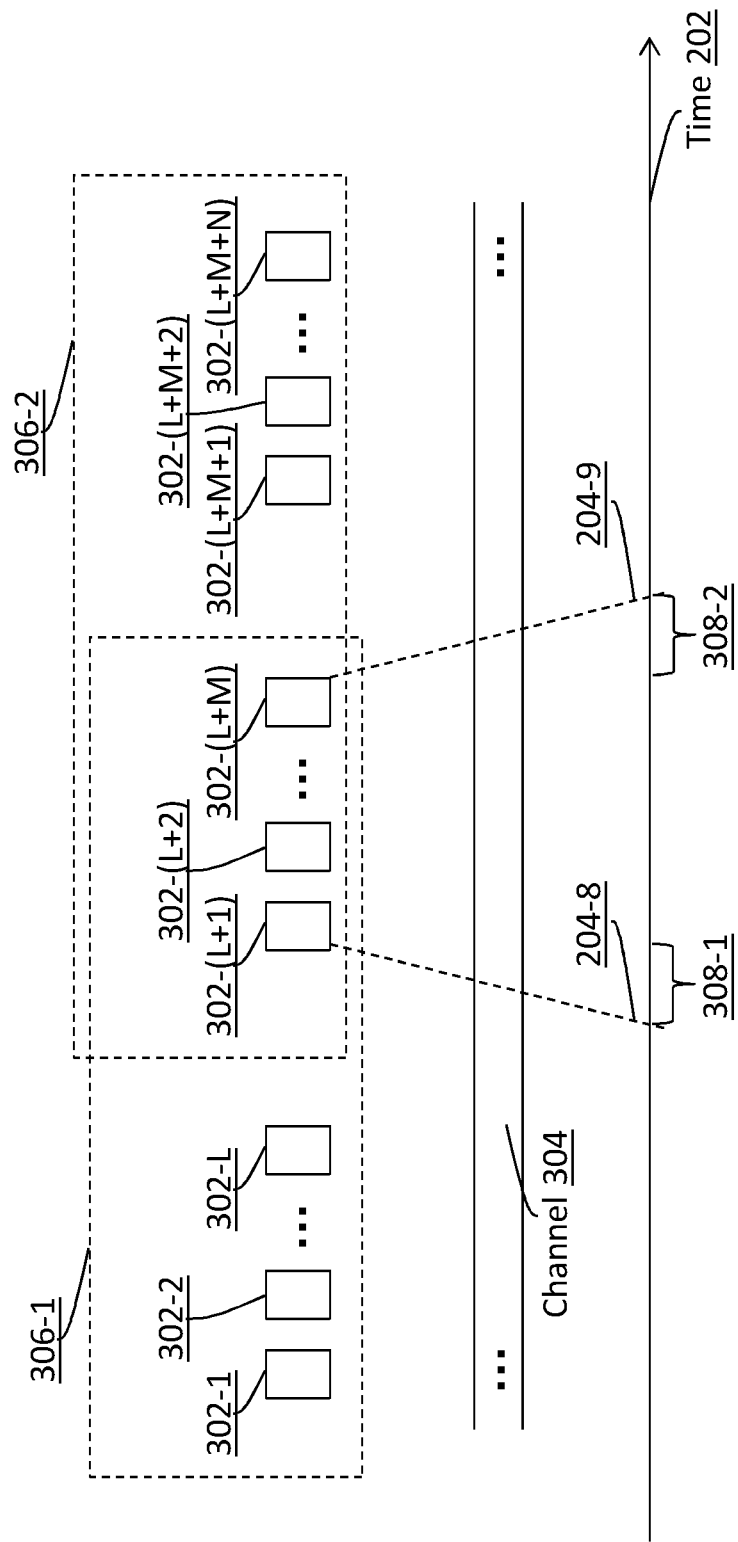
Figure 3C:
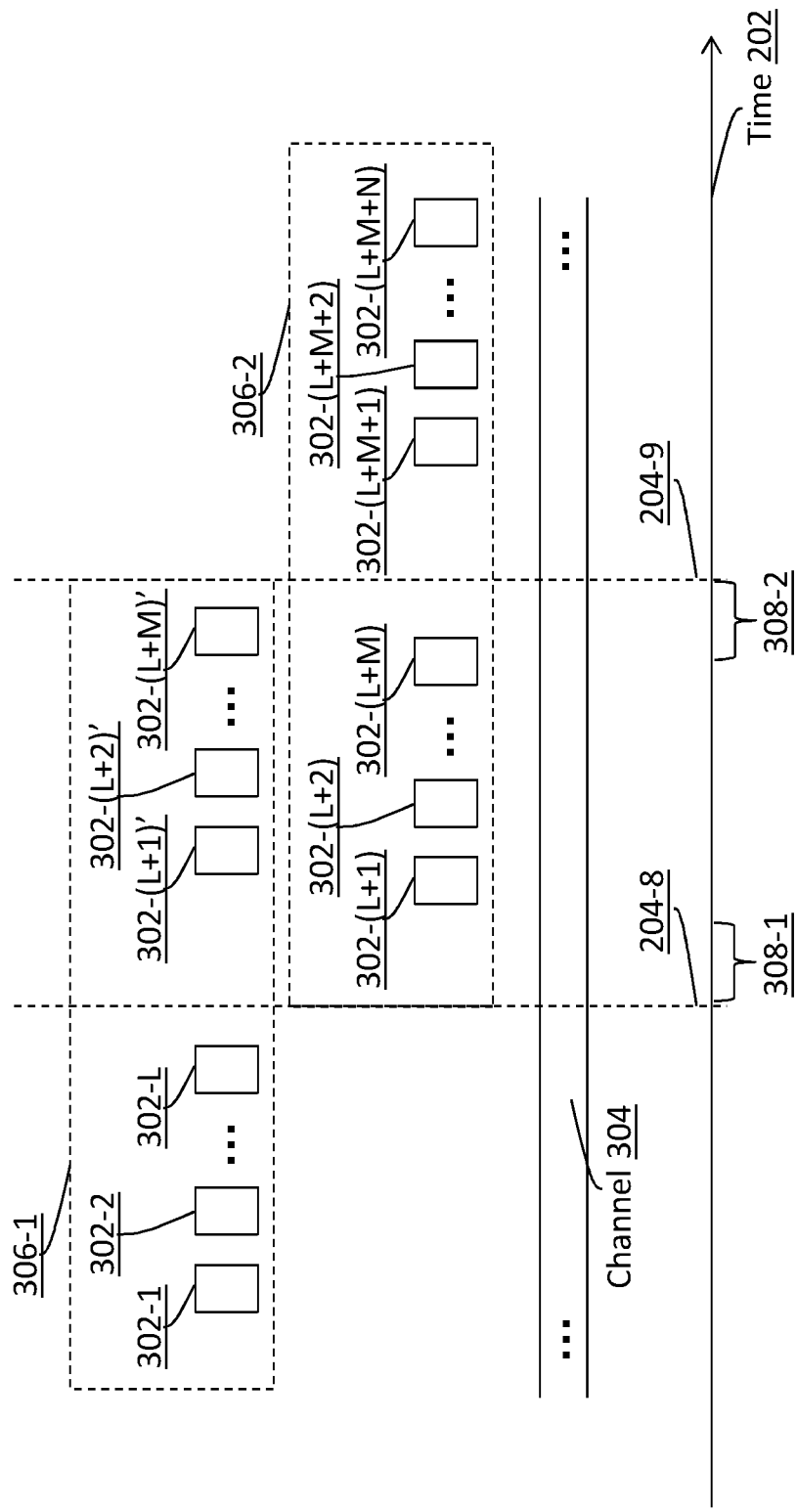

In some embodiments, as illustrated in FIG. 3A and FIG. 3B, a recording engine (e.g., 104, etc.) in the multimedia device (102) is configured to record one or more media segments (e.g., 302-1 through 302-(L+M+N) of FIG. 3A, etc.) for scheduled recordings (e.g., as represented by scheduling records 114-2, 114-3, etc.) of media programs (e.g., 120-2, 120-3, etc.) received by a tuner (e.g., 106-1, etc.) from a channel (e.g., 304 of FIG. 3A, etc.). A media segment may be generated to store a recorded portion (e.g., representing a time duration from a first time point 2:14 to a second time point 2:20, etc.) of media data received by a tuner (e.g., 106-1, etc.) from a channel (e.g., 304 of FIG. 3A, etc.). Media segments may refer to audio clips, video clips, audiovisual clips, etc., and may, but are not required to, vary in sizes, in time durations, etc., which the media segments respectively cover for the received media data.

The recording engine (104) may generate a media program object (e.g., 306-1, etc.) to represent a scheduled recording (e.g., as represented by a scheduling record 114-2, etc.) of a media program (e.g., 120-2, etc.). The media program object (306-1) may be used to make references to specific media segments (e.g., media segments 302-1 through 302-(L+M), etc.) that constitute the scheduled recording (as represented by the scheduling record 114-2 in the present example) of the media program (120-2).

The multimedia device (102) maintains a reference count to account for all references made by media program objects (e.g., 306-1, 306-2, etc.) when scheduled recordings (e.g., as represented by scheduling records 114-2 and 114-3, etc.) of media programs (e.g., 120-2, 120-3, etc.) represented by the media program objects (e.g., 306-1, 306-2, etc.) were made. When a scheduled recording (e.g., as represented by a scheduling record 114-2, etc.) of a media program (e.g., 120-2, etc.) is to be deleted, each of reference counts of media segments (e.g., 302-1 through 302-(L+M), etc.) that are referenced by the scheduled recording (e.g., as represented by a scheduling record 114-2, etc.) of the media program (e.g., 120-2, etc.) is decremented by a unit (e.g., by one (1), a number representing a single reference, etc.). If a reference count of a media segment (e.g., 302-1, etc.) is zero or otherwise indicates that there is no reference made by any (remaining) media program object representing a (remaining) media program, the media segment (302) may be deleted or garbage collected (e.g., removed in a subsequent execution of garbage collection by a background process, etc.). As used herein, removing or deleting an object such as removing or deleting a media segment or a media program object or a scheduled recording of a media program may refer to removing or deleting such an object instantaneously, and alternatively may also refer to marking such an object for removing or deleting in a later operation (e.g., a garbage collection operation, etc.).

6.0 Shared Media Segments

For the purpose of illustration, recording back-to-back media programs on the same channel (e.g., using the same tuner, etc.) may be implemented in the following non-limiting example implementations. In a first example implementation, in some embodiments, the recording engine (104) is configured to determine that a first scheduled recording (e.g., as represented by a scheduling record 114-2, etc.) of a first media program (e.g., an original media program, 120-2, etc.) is overlapped with a second scheduled recording (e.g., as represented by a scheduling record 114-3, etc.) of a second media program (e.g., an overlapping media program, 120-3, etc.). The recording engine (104) may record zero, one or more first media segments (e.g., 302-1 through 302-L of FIG. 3A, etc.) before the start time (204-3 in the present example) of the second scheduled recording (as indicated in 114-3 of FIG. 2 in the present example) of the second media program (120-3 of FIG. 1 in the present example). A first media program object (306-1 in the present example) may be used to represent the first scheduled recording (as indicated in 114-2 of FIG. 2 in the present example) of the first media program (120-2 in the present example) and to make reference to each of the first media segments (302-1 through 302-L of FIG. 3A in the present example).

The recording engine (108) is configured to detect/determine/identify a first time point (204-8) at which the recording engine (108) starts to record one or more shared media segments (302-(L+1) through 302-(L+M) of FIG. 3A in the present example). The shared media segments (302-(L+1) through 302-(L+M)) are to be shared (or referenced) by (e.g., the first media program object 306-1 representing, etc.) the first scheduled recording (as indicated in 114-2) of the first media program (120-2) and (e.g., the second media program object 306-2 representing, etc.) the second scheduled recording (as indicated in 114-3) of the second media program (120-3).

In some embodiments, the first time point (204-8) is the start time of the second scheduled recording (as indicated in 114-3) of the second media program (120-3). While recording a media segment (302-L in the present example), the recording engine (108) may detect/determine that the start time (204-3) of the second scheduled recording (as indicated in 114-3) of the second media program (120-3) has been reached. Upon detecting/determining so, the recording engine (108) may terminate/finish/complete the media segment (302-L) and start a new media segment (302-(L+1) in the present example) from the start time (204-3) of the second scheduled recording (as indicated in 114-3) of the second media program (120-3). The new media segment (302-(L+1)) is the first of the shared media segments (302-(L+1) through 302-(L+M)) time-wise (e.g., along the time direction as indicated by 202, etc.).

In some embodiments, the first time point (204-8) is a time point at which a new media segment (302-(L+1) in this example) will begin to cover a first time duration (e.g., 308-1 of FIG. 3B, etc.) that includes the start time (204-3) of the second scheduled recording (as indicated in 114-3) of the second media program (120-3). In some embodiments, the recording engine (108) can be configured to estimate an approximate time duration a new media segment can cover based on one or more factors. These factors may include, but are not limited to: the rate of transmission in a particular channel, the recording mode (e.g., high definition, media definition, standard definition, low definition, etc.), statistics or information of time durations of previously recorded media segments in the same or a similar channel, transport stream type, etc. The new media segment (e.g., 302-(L+1), etc.) can cover a time duration that includes the start time (204-3) of the second scheduled recording (as indicated in 114-3) of the second media program (120-3) is the first of the shared media segments (302-(L+1) through 302-(L+M)) time-wise.

In some embodiments, the recording engine (108) is further configured to detect/determine/identify a second time point (202-9) at which the recording engine (108) ends recording the shared media segments (302-(L+1) through 302-(L+M)), and starts recording zero, one, or more second media segments (e.g., 302-(L+M+1) through 302-(L+M+N), etc.). The second media segments (302-(L+M+1) through 302-(L+M+N) in the present example) are included/referenced by (e.g., the second media program object 306-2 representing, etc.) the second scheduled recording (as indicated in 114-3) of the second media program (120-3), but not by (e.g., the first media program object 306-1 representing, etc.) the first scheduled recording (as indicated in 114-3) of the first media program (120-2).

In some embodiments, the second time point (204-9) is the end time (204-4 in the present example) of the first scheduled recording (as indicated in 114-2) of the first media program (120-2). While recording a media segment (e.g., 302-(L+M), etc.) of the shared media segments (302-(L+1) through 302-(L+M)), the recording engine (108) may detect/determine that the end time (204-4) of the first scheduled recording (as indicated in 114-2) of the first media program (120-2) has been reached. Upon detecting/determining so, the recording engine (108) may terminate/finish/complete the (last) media segment (e.g., 302-(L+M)) of the shared media segments (302-(L+1) through 302-(L+M)) and start a new media segment (302-(L+M+1) in the present example) from the end time (204-4) of the first scheduled recording (as indicated in 114-2) of the first media program (120-2). The new media segment (302-(L+M+1)) is the first of the second media segments (302-(L+M+1) through 302-(L+M+N)) time-wise.

In some embodiments, the second time point (204-9) is a time point at the end of a particular media segment (302-(L+M) in this example) that covers a second time duration (e.g., 308-2 of FIG. 3B, etc.) that includes the end time (204-4 of FIG. 2) of the first scheduled recording (as indicated in 114-2 of FIG. 2) of the first media program (120-2). This time point (204-9) is also the beginning of a new media segment (302-(L+M+1) in this example) immediately following the particular media segment (302-(L+M)). The particular media segment (302-(L+M)) may be the last of the shared media segments ((302-(L+1) through 302-(L+M)) time-wise, whereas the new media segment (302-(L+M+1)) may be the first of the second media segments (302-(L+M+1) through 302-(L+M+N)) time-wise.

The recording engine (108) is configured to continue recording zero, one or more second media segments (302-(L+M+1) through 302-(L+M+N)) until the end time of the second scheduled recording of the second media program (120-3) is reached if no subsequent media program overlaps with the second media program (120-3), or in this example until another overlap with a subsequent media program (e.g., 120-4) is encountered (at 204-5 in the present example).

7.0 Consolidated Recording

In a second example implementation, when two or more scheduled recordings (e.g., as indicated by 114-1 through 114-4 of FIG. 2, etc.) of two or more media programs (e.g., 120-1 through 120-4, etc.) collectively covers a contiguous time duration (e.g., from 204-10 to 204-7, etc.), a recording engine (e.g., 108, etc.) in a multimedia device (e.g., 102, etc.) is configured to first make a consolidated recording during the contiguous time duration (204-10 to 204-7) that covers the two or more scheduled recordings (as indicated by 114-1 through 114-4 of FIG. 2) of two or more media programs (120-1 through 120-4). The consolidated recording starts recording at the earliest start time (204-10 in the present example) of the two or more media programs (120-1 through 120-4) and ends recording at the last end time (204-7 in the present example) of the two or more media programs (120-1 through 120-4). In response to the completion of the consolidated recording, the multimedia device (102) determines, for each media segment (e.g., each of 302-1 through 302-(L+M+N), etc.) in the consolidated recording, which scheduled recordings of the two or more media programs (120-1 through 120-4) should reference/include that media segment. The multimedia device (102) updates each media program object (e.g., each of 306-1 and 306-2, etc.) representing a corresponding media program (e.g., 120-1, 120-2, 120-3, 120-4, etc.) of the two or more media programs (120-1 through 120-4) to include references to media segments (e.g., 302-1 through 302-(L+M+N), etc.) that should be referenced/included in that media program object (e.g., 306-1, 306-2, etc.).

In some embodiments, a media segment—in the consolidated recording—that includes a start time (e.g., 204-3, etc.) of an overlapping media program (e.g., 120-3 in the previous example, etc.) may be split into two media segments (e.g., 302-L and 302-(L+1), etc.) at the start time (204-3) of the overlapping media program (120-3). A first media segment (302-L in this example), which is before the start time (204-3) of the overlapping media program (120-3), of the two media segments (302-L and 302-(L+1)) is to be referenced by an original media program (120-2 in the present example) but not by the overlapping media program (120-3). A second media segment (302-(L+1) in this example), which is after the start time (204-3) of the overlapping media program (120-3), of the two media segments (302-L and 302-(L+1)) is to be a shared media segment between the original and overlapping media programs (120-2 and 12-3 in the present example).

In some embodiments, a media segment—in the consolidated recording—that includes an end time (e.g., 204-4, etc.) of the original media program (e.g., 120-2 in the present example, etc.) may be split into two media segments (e.g., 302-(L+M) and 302-(L+M+1), etc.) at the end time (204-4) of the original media program (120-2). A third media segment (302-(L+M)) in the present example), which is before the end time (204-4) of the original media program (120-2), of the two media segments (302-(L+M) and 302-(L+M+1)) is to be a shared media segment referenced by both the original media program (120-2) and the overlapping media program (120-3). A fourth media segment (302-(L+M+1)), which is after the end time (204-4) of the original media program (120-2), of the two media segments (302-(L+M) and 302-(L+M+1)) is to be referenced by the overlapping media program (120-3) but not by the original media program (120-2).

In some embodiments, a media segment (e.g., 302-(L+1), 302-(L+M), etc.) that covers a time duration (e.g., 308-1 of FIG. 3B, 308-2 of FIG. 3B, etc.) including either a start time (e.g., 204-3, etc.) of an overlapping media program (e.g., 120-3 in the previous example, etc.) or an end time (e.g., 204-4, etc.) of an original media program (e.g., 120-2, etc.) may be (simply) determined as a shared media segment by both of the original and overlapping media programs (120-1 and 120-2) and accordingly can be referenced by media program objects (306-1 and 306-2 in the present example) representing both of the original and overlapping media programs (120-1 and 120-2).

Accordingly, as in the first example implementation, each of the media programs for which the consolidated recording includes can be represented by a corresponding media program object that maintains references to media segments in the consolidated recording and that can be used for playback and trick play purposes.

8.0 Duplicate Recordings of Overlapped Portion

In a third example implementation, a recording engine (e.g., 108, etc.) in a multimedia device (e.g., 102, etc.) is configured to detect/determine/identify a first time point (e.g., 204-8, etc.) at which at least two media programs (e.g., 120-2 and 120-3, etc.) start to overlap. As in the first example implementation, the first time point (204-8) in this third example implementation may be the start time (e.g., 204-3) of the second scheduled recording (e.g., as indicated in 114-3, etc.) of the second media program (120-3 in the present example). Alternatively or optionally, the first time point (204-8) may be a time point at which a new media segment (e.g., 302-(L+1), 302-(L+1)', etc.) will cover a first time duration (e.g., 308-1 of FIG. 3C, etc.) that includes the start time (204-3) of the second scheduled recording (114-3) of the second media program (120-3). Instead of recording a single copy of the shared media segments as in the first and second example implementations, the recording engine (108) as described herein may be configured to spawn off at least two independent writing threads. For example, each of the two independent writing threads receives media data in the same channel (e.g., 304, etc.) and records its own media segments (e.g., 302-(L+1) through 302-(L+M) and 302-(L+1)' through 302-(L+M)', etc.) based on the received media data in the same channel (304). A first writing thread in the two independent writing threads generates media segments (302-(L+M) and 302-(L+1)' through 302-(L+M)' in the present example) to be included/referenced in the first scheduled recording (as indicated in 114-2) of the first media program (120-2) but not in the second scheduled recording (as indicated in 114-3) of the second media program (120-3); a second writing thread in the two independent writing threads generates media segments (302-(L+1) through 302-(L+M) in the present example) to be included/referenced in the second scheduled recording (as indicated in 114-3) of the second media program (120-3) but not in the first scheduled recording (as indicated in 114-2) of the first media program (120-2); and so on. It should be noted that the number of media segments 302-(L+1) through 302-(L+M) can, but is not required to, equal the number of media segments 302-(L+1)' through 302-(L+M)'.

In some embodiments, the recording engine (108) is configured to detect/determine/identify a second time point (e.g., 204-9, etc.) at which a specific media program (e.g., 120-3 in the present example, etc.) of the at least two media programs (120-2 and 120-3) ends overlapping with the remaining (120-2 in the present example) of the at least two media programs (120-2 and 120-3). As in the first and second example implementations, the second time point (204-9) in this third example implementation may be the end time (204-4) of the first scheduled recording (as indicated in 114-2) of the first media program (120-2). Alternatively or optionally, the second time point (204-9) may be a time point terminating/finishing/completing two specific media segments (e.g., 204-(L+M) and 204-(L+M)', etc.) each of which is written by one of the two writing threads such that the specific media segments ends after the end time (204-4) of the first scheduled recording (as indicated in 114-2) of the first media program (120-2). The recording engine (108) in the multimedia device (102) in the third example implementation may be configured to end one of the at least two independent writing threads after the two specific media segments (204-(L+M) and 204-(L+M)' in the present example).

The recording engine (108) is configured to continue recording zero, one or more media segments with any remaining writing thread(s) for any remaining media program(s) so long as the end of the last scheduled recording of the last media program has not been reached.

In some embodiments, a media program object that represents a scheduled recording of a media program comprises data in one or more data structures (e.g., a linked list, sequence, array, a hash table, contiguous/non-contiguous memory, frame index tables, etc.) that identifies media segments referenced/included in the scheduled recording, identifies respective time-wise orders of the media segments, etc. The data in the data structures of the media program object allows the media segments to be played in various trick play modes in the correct time order (e.g., as represented by the actual transmission from a media program source to the multimedia device, sequential order as indicated by frame timestamps, etc.). The data in the data structures of the media program object also allows a prevention of shared media segments from being deleted prematurely when another media program (or another media program object) is deleted or garbage corrected in the multimedia device. In some embodiments, the length of a scheduled recording of a media program includes both the lengths of shared media segments and any non-shared media segments in the media program.

A media segment as described herein may be able to hold media data for a certain length of time such as 2 minutes, 4 minutes, 6 minutes, etc., depending on the bit rate associated with the transmission of media data in a media signal and/or the allocated size of media memory segments. A recording engine (e.g., 108, etc.) as described herein may identify the current media segment that is being generated with a specific tuner that has been assigned to a channel and proceed to obtain (e.g., header, detailed, control, etc.) information related to the current media segment. The recording engine (108) can also obtain information from the recording schedule (112) or any scheduling records therein about the current media program (e.g., original program, rerun, season number, episode number, first shown date, etc.) that is being recorded with the specific tuner and any other media programs that may overlap with the current media program. For example, the recording engine (108) may determine that the current media segment starting at a time 7:12, with a data capacity of storing (e.g., approximately, etc.) 6-minutes of media data, would likely cover a time 7:15, which may be determined as the start time of an overlapping media program. The recording engine (108) may locate a proper boundary (e.g., at the end of one or more frames, at a particular location in relation to a specific frame type such as I-frame, P-frame, etc.) to terminate/finish/complete the current media segment and to start a new media segment. Similarly, a recording engine (108) may locate a proper boundary (e.g., at the end of one or more frames, at a particular location in relation to a specific frame type such as I-frame, P-frame, etc.) to slice an existing media segment (e.g., in a consolidated recording, etc.) into two or more smaller consecutive media segments. In some embodiments, switching from one media segment to the next media segment or splicing one media segment into multiple media segments can be (e.g., seamlessly, etc.) performed with no or few visible artifacts, glitches, etc., when these media segments are played.

A media program object may include/reference media segments stored in the data repository (110) by copying references of other media program objects to the media segments. For example, a media program object representing an overlapping media program may copy references to shared media segments from another media program object representing an original media program in order for the former media program object to start playing the overlapping media program with the shared media segments being played first.

In some embodiments, one or more overlapping media programs can be subsumed by a preceding original media program (e.g., a soccer game, concert, event, etc., with long paddings). For example, the second time that signals the end of sharing between the preceding media program and a subsumed overlapping media program may be the end time of the subsumed overlapping media program rather than the end time of the preceding original media program. Furthermore, instead of recording second media segments for a subsumed overlapping media program, zero, one or more additional first media segments of the original media programs may be recorded after the end time of the subsumed overlapping media program.

In some embodiments, instead of sharing (e.g., a single copy of, etc.) media segments that store media data in an overlapped time duration between an original media program and an overlapping media program, these media segments can be duplicated so that each media program object refers to its own set of non-shared media segments. For example, after a consolidated recording is made to cover both an original media program and an overlapping media program, the consolidated recording may be sliced at the start time and the end time of a scheduled recording (e.g., as indicated in a scheduling record, etc.) of the original media program to generate a set of non-shared media segments to be (e.g., exclusively, etc.) referenced/included in the original media program. The consolidated recording may also be sliced at the start time and the end time of a different scheduled recording (e.g., as indicated in a different scheduling record, etc.) of the overlapping media program to generate a different set of non-shared media segments to be (e.g., exclusively, etc.) referenced/included in the overlapping media program.

9.0 Example Process Flows

Figure 4A:
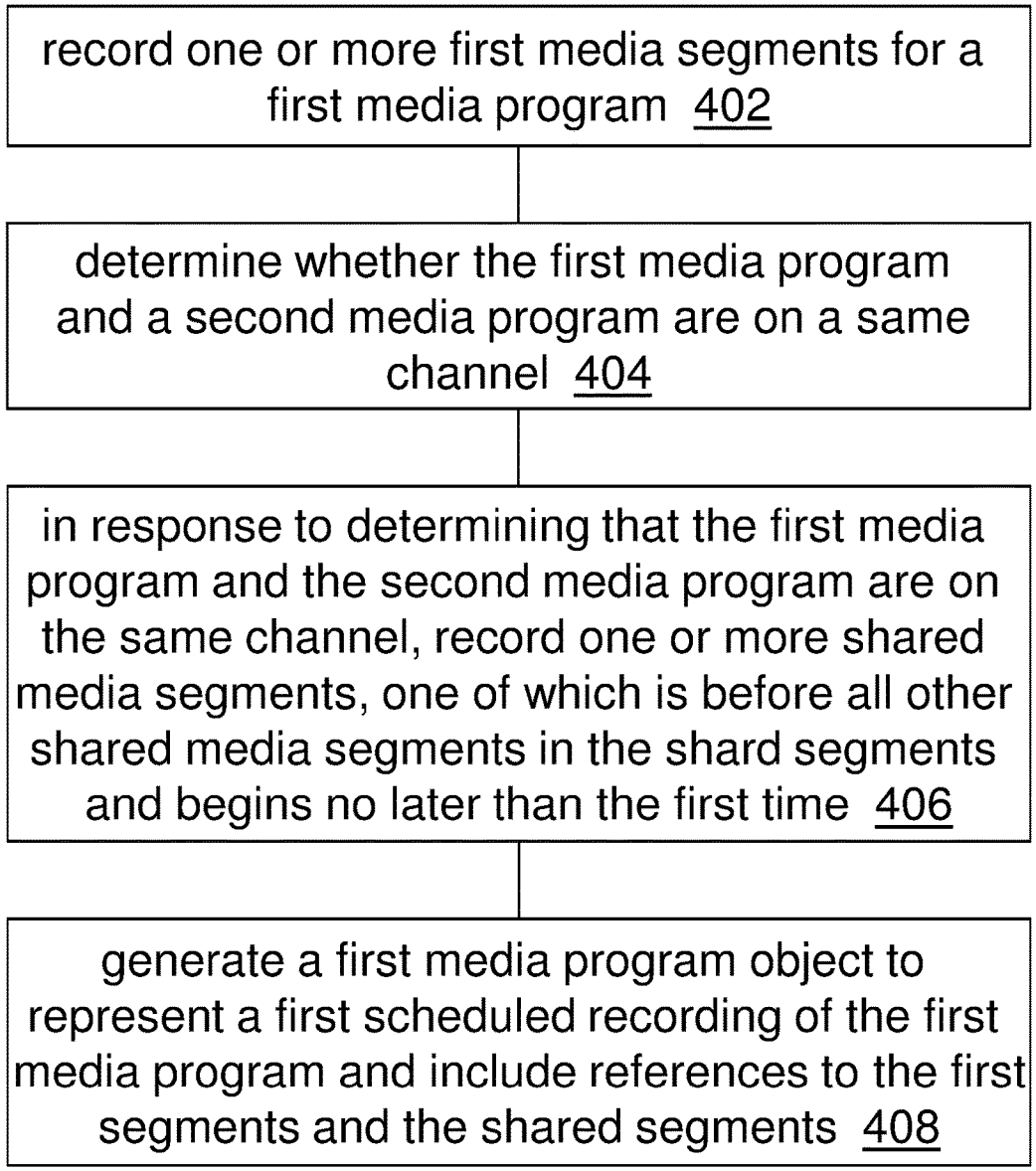
FIG. 4A, FIG. 4B and FIG. 4C illustrate example process flows, in accordance with one or more embodiments.
Figure 4B:
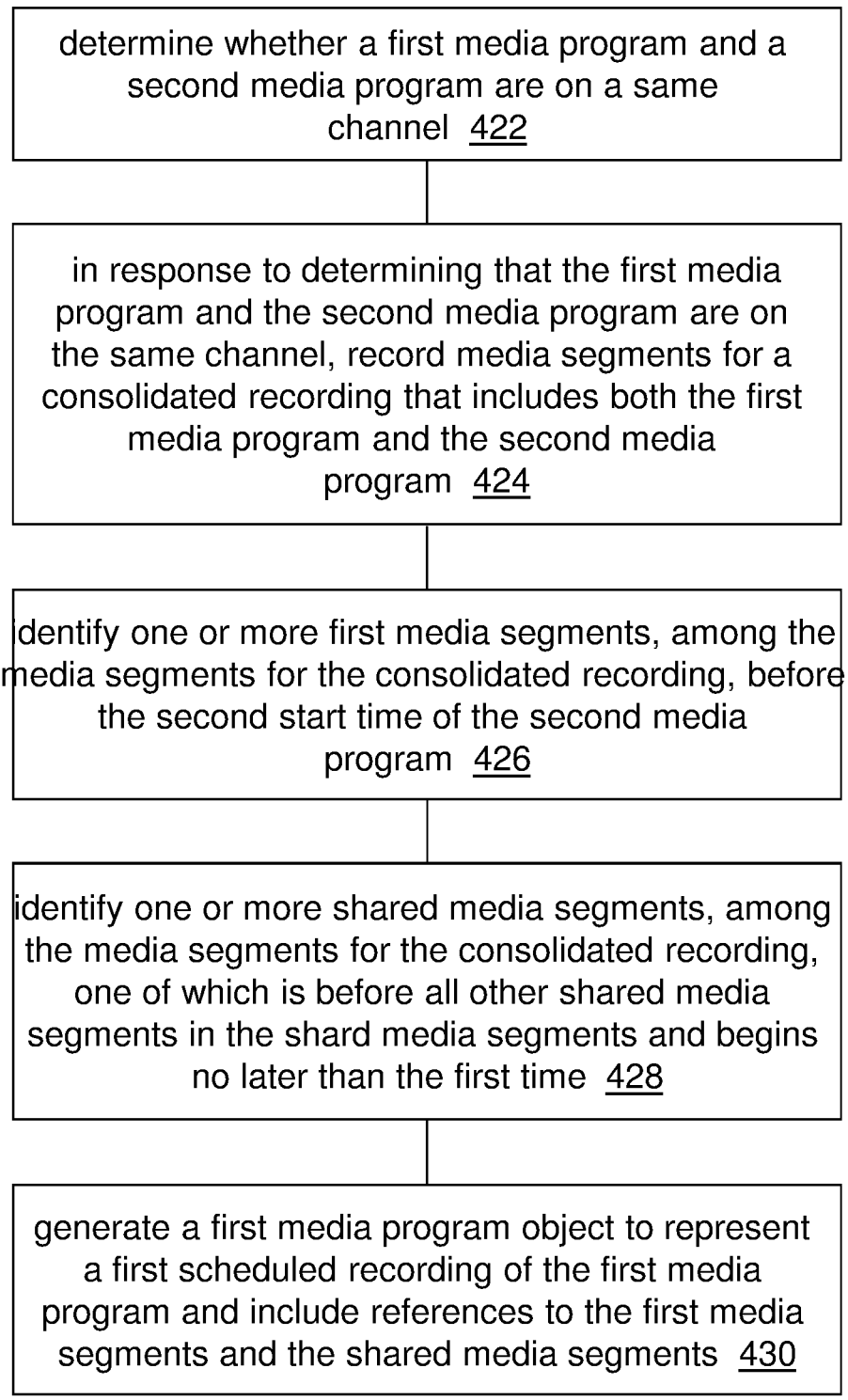
Figure 4C:
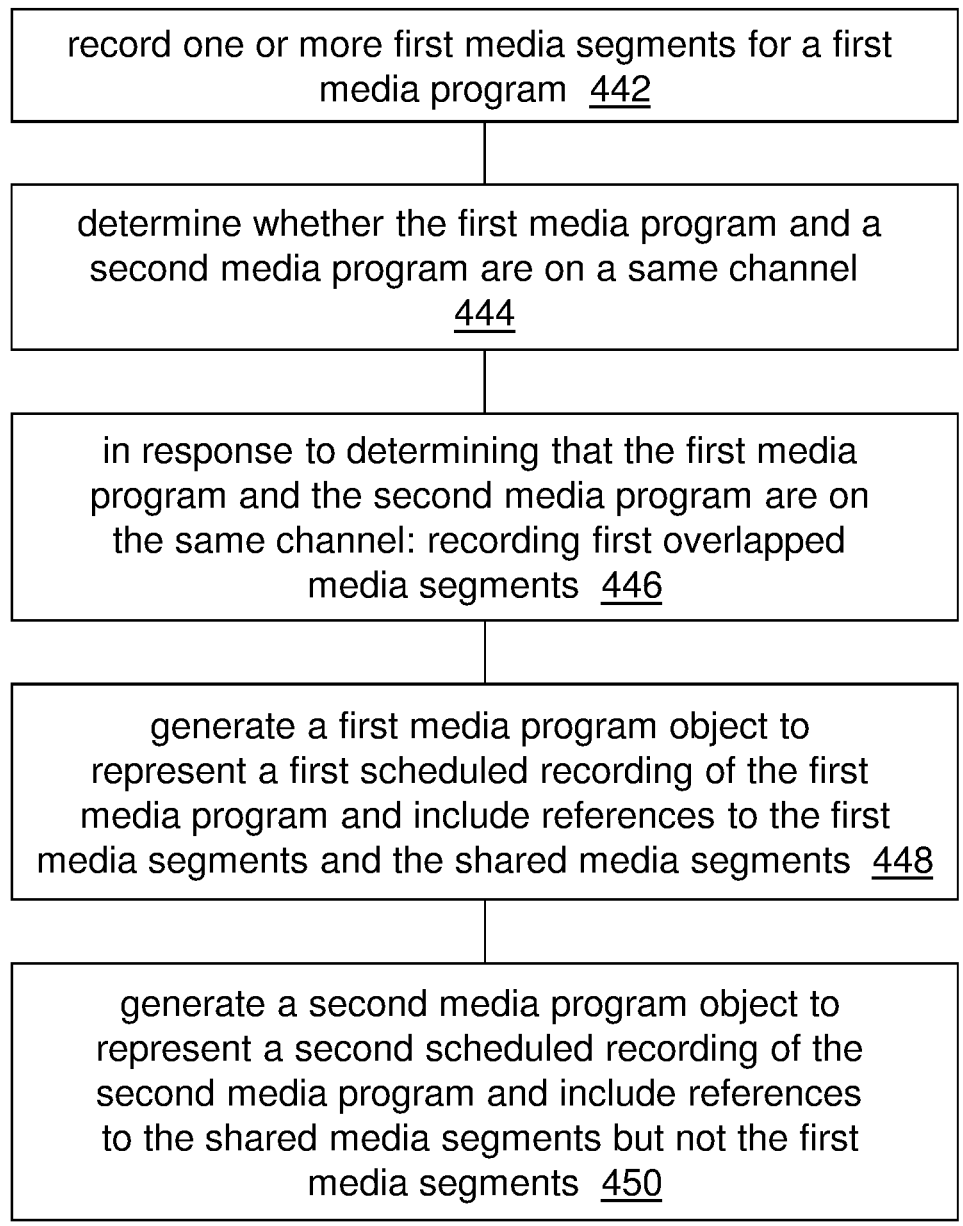

FIG. 4A, FIG. 4B and FIG. 4C illustrates example methods/processes that can be used by a multimedia device (e.g., 102, etc.) to record media programs (e.g., using the same tuner, etc.) that at least include a first media program and a second media program overlapping with each other. In some embodiments, an example method/process as described herein is performed while media data is being received, through a single tuner or through multiple tuners from one or more media program sources, by the multimedia device for recording. Each of the example processes of FIG. 4A, FIG. 4B and FIG. 4C can be implemented by one or more computing devices such as the multimedia device 102 of FIG. 1, etc. For the purpose of illustration only, the first media program may be the media program 120-2, whereas the second media program may be the media program 120-3.

In the example process/method as illustrated in FIG. 4A, in block 402, the multimedia device (102) records one or more first media segments for the first media program. The first media program is scheduled to start at a first start time and end at a first end time, whereas the second media program is scheduled to start at a second start time and end at a second end time, the first end time being after the second start time. In some embodiments, the first media program and the second media program are received by the multimedia device (102) with a same tuner.

In block 404, the multimedia device (102) determines whether the first media program and the second media program are (e.g., transmitted, received, etc.) on a same channel. The multimedia device (102) can use scheduling records (e.g., 114-1, 114-2, 114-3, 114-4, etc.) in a recording schedule (112) to determine which channel a media program is to be recorded from. The multimedia device (102) can also use the recording schedule (112), tuner information maintained by the multimedia device (102), etc., to determine which tuner (e.g., 106-1, 106-2, etc.) is assigned to record a particular media program.

In block 406, in response to determining that the first media program and the second media program are on the same channel, the multimedia device (102) records one or more shared media segments, one of which is before all other shared media segments in the shared media segments and begins no later than the second start time.

In block 408, the multimedia device (102) generates a first media program object to represent a first scheduled recording of the first media program, the first media program object including references to the first media segments and the shared media segments.

In an embodiment in which the first end time is before the second end time; the multimedia device (102) is further configured to, in response to determining that the first media program and the second media program are on the same channel, perform: ending recording the shared media segments no earlier than the first end time, and in response to ending recording the shared media segments, recording one or more second media segments after the first end time; and generate a second media program object to represent a second scheduled recording of the second media program, the second media program object including references to the shared media segments and the second media segments but not to the first media segments.

In an embodiment, the first end time is after the second end time; the multimedia device (102) is further configured to, in response to determining that the first media program and the second media program are on the same channel, perform: ending recording the shared media segments no earlier than the second end time, and in response to recording ending recording the shared media segments, continuing recording additional first media segments after the second end time; and generate a second media program object to represent a second scheduled recording of the second media program, the second media program object including references to the shared media segments but not to the first media segments and the additional first media segments.

In the example process/method as illustrated in FIG. 4B, in block 422, a multimedia device (e.g., 102, etc.) determines whether a first media program and a second media program are (e.g., transmitted, received, etc.) on a same channel, the first media program scheduled to start at a first start time and end at a first end time, the second media program scheduled to start at a second start time and end at a second end time, the first end time being after the second start time. In some embodiments, the first media program and the second media program are received by the multimedia device (102) with a same tuner.

In blocks 424-428, the multimedia device (102) performs the following steps in response to determining that the first media program and the second media program are on the same channel.

In block 424, the multimedia device (102) records media segments for a consolidated recording that includes both the first media program and the second media program.

In block 426, the multimedia device (102) identifies one or more first media segments, among the media segments for the consolidated recording, before the second start time of the second media program.

In block 428, the multimedia device (102) identifies one or more shared media segments, among the media segments for the consolidated recording, one of which is before all other shared media segments in the shared media segments and begins no later than the second start time.

In block 430, the multimedia device (102) generates a first media program object to represent a first scheduled recording of the first media program, the first media program object including references to the first media segments and the shared media segments.

In an embodiment, the first end time is before the second end time; the multimedia device (102) is further configured to, in response to determining that the first media program and the second media program are on the same channel, identify one or more second media segments after the first end time among the media segments for the consolidated recording; and generate a second media program object to represent a second scheduled recording of the second media program, the second media program object including references to the shared media segments and the second media segments but not to the first media segments.

In an embodiment, the first end time is after the second end time; the multimedia device (102) is further configured to, in response to determining that the first media program and the second media program are on the same channel, identify additional first media segments after the second end time among the media segments for the consolidated recording; and generate a second media program object to represent a second scheduled recording of the second media program, the second media program object including references to the shared media segments but not to the first media segments and the additional first media segments.

In an embodiment, the first media program overlaps with a previous media program preceding the first media program; the consolidated recording further includes the previous media program.

In the example process/method as illustrated in FIG. 4C, in block 442, a multimedia device (e.g., 102, etc.) records one or more first media segments for a first media program, the first media program scheduled to start at a first start time and end at a first end time, a second media program scheduled to start at a second start time and end at a second end time, the first end time being after the second start time.

In some embodiments, the first media program and the second media program are received by the multimedia device (102) with a same tuner.

In block 444, the multimedia device (102) determines whether the first media program and the second media program are (e.g., transmitted, received, etc.) on a same channel.

In block 446, the multimedia device (102) performs, in response to determining that the first media program and the second media program are on the same channel: recording (e.g., in a first writing thread, process, procedure, function, etc.) one or more first overlapped media segments, one of which is before all other first media segments in the first media segments and begins no later than the second start time, and recording (e.g., in a second writing thread, process, procedure, function, etc.) one or more second overlapped media segments, one of which is before all other second media segments in the second media segments and begins no later than the second start time.

In block 448, the multimedia device (102) generates a first media program object to represent a first recording of the first media program, the first media program object including references to the first media segments and the shared media segments.

In block 450, the multimedia device (102) generates a second media program object to represent a second recording of the second media program, the second media program object including references to the shared media segments but not the first media segments.

Here, both the first overlapped media segments and the second overlapped media segments are generated based at least in part on media data in an overlapped time duration between the first media program and the second media program.

In an embodiment, the multimedia device (102) is further configured to, in response to determining that the first media program and the second media program are not on the same channel, record one or more second media segments for the second media program from the second start time using a tuner different from a particular tuner used to record the first media program.

In an embodiment, the multimedia device (102) is further configured to receive a request to delete the first recording of the first media program; and in response to receiving the request to delete the first recording of the first media program, perform: deleting the first media segments, determining whether an existing recording other than the first recording of the first media program refers to the shared media segments, and deleting the first media program object.

In an embodiment, the multimedia device (102) is further configured to, in response to determining that no existing recording other than the first recording of the first media program refers to the shared media segments, delete the shared media segments.

In an embodiment, the multimedia device (102) is further configured to, in response to determining that an existing recording other than the first recording of the first media program refers to the shared media segments, remove references by the first media program object to the shared media segments without deleting the shared media segments.

In an embodiment, the multimedia device (102) is further configured to cause the first media program to be presented for a user to select for playing back; receive a request from the user to play back the first media program; and in response to receiving the request to play back the first media program, perform: causing the first media segments to be played back along a time order as represented in the first media program object, and after the first media segments have been played back, causing the shared media segments to be played back.

In an embodiment, the multimedia device (102) is further configured to cause the second media program to be presented for a user to select for playing back; receive a request from the user to play back the second media program; in response to receiving the request to play back the second media program, perform: causing the shared media segments to be played back along a time order as represented in the second media program object, and after the shared media segments have been played back, causing the second media segments to be played back.

In an embodiment, the multimedia device (102) is further configured to receive a request to delete the second recording of the second media program; and, in response to receiving the request to delete the second recording of the second media program, perform: deleting the second media segments, determining whether an existing recording other than the second recording of the second media program refers to the shared media segments, and deleting the second media program object.

In an embodiment, the multimedia device (102) is further configured to, in response to determining that no existing recording other than the second recording of the second media program refers to the shared media segments, delete the shared media segments.

In an embodiment, the multimedia device (102) is further configured to, in response to determining that an existing recording other than the second recording of the second media program refers to the shared media segments, remove references by the second media program object to the shared media segments without deleting the shared media segments.

In an embodiment, the first media program overlaps with a previous media program preceding the first media program; and the first media program object that represents the first recording of the first media program further includes references to one or more previous shared media segments between the previous media program and the first media program.

Embodiments include an apparatus comprising a processor and configured to perform any one of the foregoing methods. Embodiments include a computer readable storage medium, storing software instructions, which when executed by one or more processors cause performance of any one of the foregoing methods.

10.0 Hardware Overview

Figure 5:
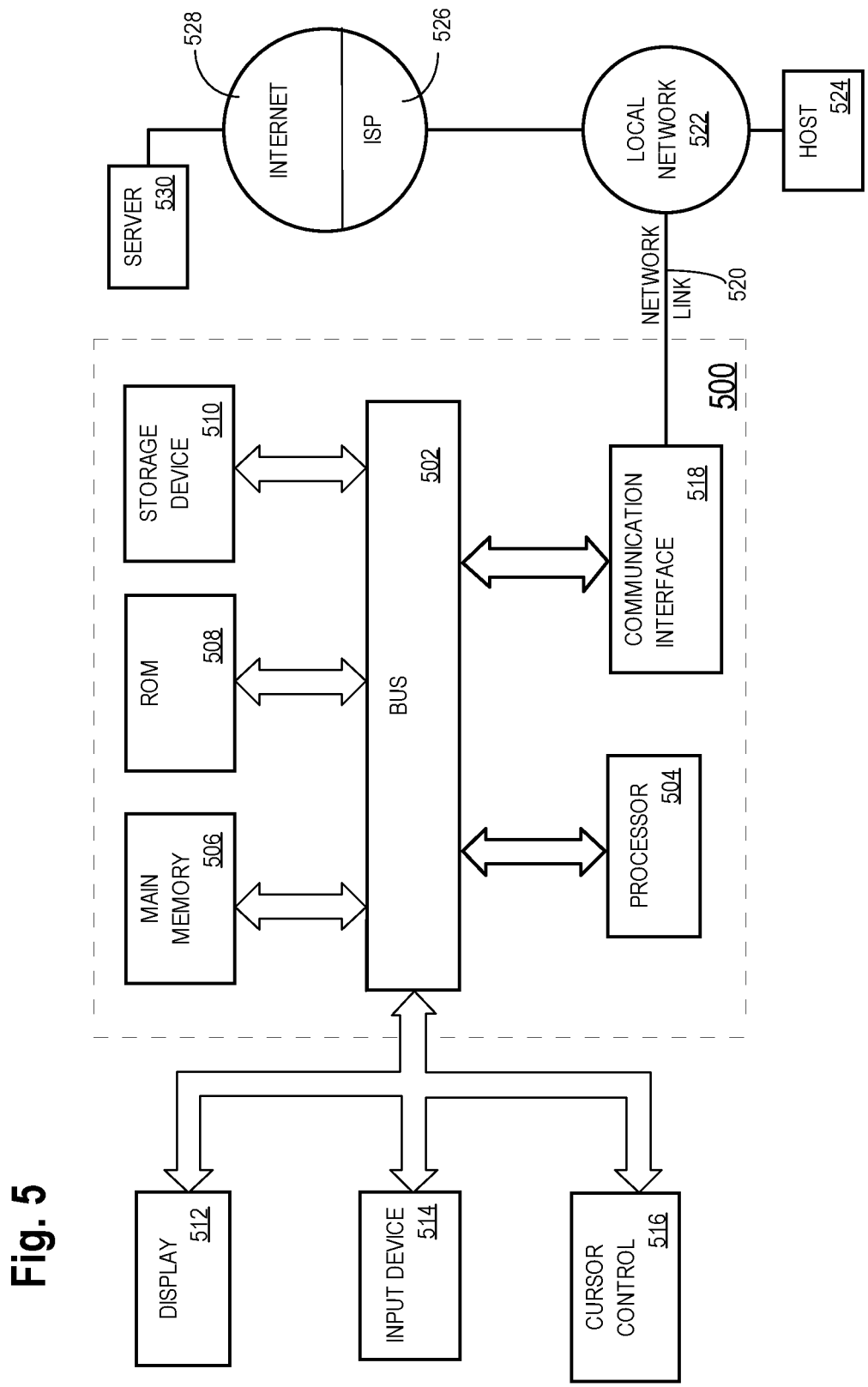
FIG. 5 shows a block diagram that illustrates a system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for a window configuration unit. According to one embodiment of the invention, the window configuration unit is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for a remote display device as described herein.

The received code may be executed by processor 504 as it is received, and/or stored in storage device 510, or other non-volatile storage for later execution. In this manner, computer system 500 may obtain application code in the form of a carrier wave.

11.0 Extensions and Alternatives

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or characteristic that is not expressly recited in a claim should limit the scope of such claim in any way. The specification and drawings are, accordingly, to be regarded in an illustrative rather than a restrictive sense.

The invention claimed is:

1. A method comprising:
    determining whether a first media program and a second media program are broadcasted on a same channel, the first media program scheduled to start at a first start time and end at a first end time, the second media program scheduled to start at a second start time and end at a second end time, the first end time being after the second start time;
    in response to determining that the first media program and the second media program are broadcasted on the same channel, performing:
        recording media segments for a consolidated recording that includes both the first media program and the second media program;
        identifying one or more first media segments, among the media segments for the consolidated recording, that precede a time no later than the second start time of the second media program; and
        identifying one or more shared media segments among the media segments for the consolidated recording, the one or more shared media segments being shared by the first media program object and the second media program object;
    generating a first media program object to represent a first recording of the first media program, the first media program object including references to the first media segments and the shared media segments; and
    generating a second media program object to represent a second recording of the second media program, the second media program object including references to the shared media segments but not to the first media segments.

2. The method of claim 1, wherein one of the one or more shared media segments ends after the second start time.

3. The method of claim 1, wherein one of the one or more shared media segments begins before the second start time.

4. The method of claim 1, wherein the first media program and the second media program are received with a same tuner.

5. The method of claim 1, further comprising:
    receiving a request to delete the first recording of the first media program;
    in response to receiving the request to delete the first recording of the first media program, performing:
        deleting the first media segments;
        determining whether an existing recording other than the first recording of the first media program refers to the shared media segments; and
        deleting the first media program object.

6. The method of claim 1, further comprising:
    causing the first recording to be presented for a user to select for play back; receiving a request from the user to play back the first recording;
    in response to receiving the request to play back the first recording, performing:
        causing the first media segments to be played back along a time order as represented in the first media program object; and
        after the first media segments have been played back, causing the shared media segments to be played back.

7. The method of claim 1, further comprising:
    causing the second recording to be presented for a user to select for play back;
    receiving a request from the user to play back the second recording;
    in response to receiving the request to play back the second recording, causing the shared media segments to be played back along a time order as represented in the second media program object.

8. The method of claim 1, wherein the first media program overlaps with a previous media program preceding the first media program; and wherein the first media program object that represents the first recording of the first media program further includes references to one or more previous shared media segments between the previous media program and the first media program.

9. A non-transitory computer readable medium storing instructions, which when executed by one or more processors cause performance of:
    determining whether a first media program and a second media program are broadcasted on a same channel, the first media program scheduled to start at a first start time and end at a first end time, the second media program scheduled to start at a second start time and end at a second end time, the first end time being after the second start time;
    in response to determining that the first media program and the second media program are broadcasted on the same channel, performing:
        recording media segments for a consolidated recording that includes both the first media program and the second media program;
        identifying one or more first media segments, among the media segments for the consolidated recording, that precede a time no later than the second start time of the second media program; and
        identifying one or more shared media segments among the media segments for the consolidated recording, the one or more shared media segments being shared by the first media program object and the second media program object;
    generating a first media program object to represent a first recording of the first media program, the first media program object including references to the first media segments and the shared media segments; and
    generating a second media program object to represent a second recording of the second media program, the second media program object including references to the shared media segments but not to the first media segments.

10. The medium of claim 9, wherein one of the one or more shared media segments ends after the second start time.

11. The medium of claim 9, wherein one of the one or more shared media segments begins before the second start time.

12. The medium of claim 9, wherein the first media program and the second media program are received with a same tuner.

13. The medium of claim 9, wherein the instructions comprise further instructions, which when executed by one or more processors cause performance of:
receiving a request to delete the first recording of the first media program;
in response to receiving the request to delete the first recording of the first media program, performing:
deleting the first media segments;
determining whether an existing recording other than the first recording of the first media program refers to the shared media segments; and
deleting the first media program object.

14. The medium of claim 9, wherein the instructions comprise further instructions, which when executed by one or more processors cause performance of:
causing the first recording to be presented for a user to select for play back;
receiving a request from the user to play back the first recording;
in response to receiving the request to play back the first recording, performing:
causing the first media segments to be played back along a time order as represented in the first media program object; and
after the first media segments have been played back, causing the shared media segments to be played back.

15. The medium of claim 9, wherein the instructions comprise further instructions, which when executed by one or more processors cause performance of:
causing the second recording to be presented for a user to select for play back;
receiving a request from the user to play back the second recording;
in response to receiving the request to play back the second recording, causing the shared media segments to be played back along a time order as represented in the second media program object.

16. The medium of claim 9, wherein the first media program overlaps with a previous media program preceding the first media program; and wherein the first media program object that represents the first recording of the first media program further includes references to one or more previous shared media segments between the previous media program and the first media program.

17. An apparatus comprising:
a subsystem, implemented at least partially in hardware, that determines whether a first media program and a second media program are broadcasted on a same channel, the first media program scheduled to start at a first start time and end at a first end time, the second media program scheduled to start at a second start time and end at a second end time, the first end time being after the second start time;
a subsystem, implemented at least partially in hardware, that, in response to determining that the first media program and the second media program are broadcasted on the same channel, performs:
recording media segments for a consolidated recording that includes both the first media program and the second media program; identifying one or more first media segments, among the media segments for the consolidated recording, that precede a time no later than the second start time of the second media program; and
identifying one or more shared media segments among the media segments for the consolidated recording, the one or more shared media segments being shared by the first media program object and the second media program object;
a subsystem, implemented at least partially in hardware, that generates a first media program object to represent a first recording of the first media program, the first media program object including references to the first media segments and the shared media segments; and
a subsystem, implemented at least partially in hardware, that generates a second media program object to represent a second recording of the second media program, the second media program object including references to the shared media segments but not to the first media segments.

18. The apparatus of claim 17, wherein one of the one or more shared media segments ends after the second start time.

19. The apparatus of claim 17, wherein one of the one or more shared media segments begins before the second start time.

20. The apparatus of claim 17, wherein the first media program and the second media program are received with a same tuner.

21. The apparatus of claim 17, further comprising:
a subsystem, implemented at least partially in hardware, that receives a request to delete the first recording of the first media program;
a subsystem, implemented at least partially in hardware, that, in response to receiving the request to delete the first recording of the first media program, performs:
deleting the first media segments;
determining whether an existing recording other than the first recording of the first media program refers to the shared media segments; and
deleting the first media program object.

22. The apparatus of claim 17, further comprising:
a subsystem, implemented at least partially in hardware, that causes the first recording to be presented for a user to select for play back;
a subsystem, implemented at least partially in hardware, that receives a request from the user to play back the first recording;
a subsystem, implemented at least partially in hardware, that, in response to receiving the request to play back the first recording, performs:
causing the first media segments to be played back along a time order as represented in the first media program object; and
after the first media segments have been played back, causing the shared media segments to be played back.

23. The apparatus of claim 17, further comprising:
a subsystem, implemented at least partially in hardware, that causes the second recording to be presented for a user to select for play back;
a subsystem, implemented at least partially in hardware, that receives a request from the user to play back the second recording;
a subsystem, implemented at least partially in hardware, that, in response to receiving the request to play back the second recording, causes the shared media segments to be played back along a time order as represented in the second media program object.

24. The apparatus of claim 17, wherein the first media program overlaps with a previous media program preceding the first media program; and wherein the first media program object that represents the first recording of the first media program further includes references to one or more previous shared media segments between the previous media program and the first media program.

* * * * *